US009189046B2

(12) United States Patent
Man et al.

(10) Patent No.: US 9,189,046 B2
(45) Date of Patent: *Nov. 17, 2015

(54) PERFORMING CROSS-DOMAIN THERMAL CONTROL IN A PROCESSOR

(71) Applicant: Intel Corporation, Santa Clara, CA (US)

(72) Inventors: Xiuting C. Man, Portland, OR (US); Michael N. Derr, El Dorado Hills, CA (US); Jay D. Schwartz, Aloha, OR (US); Stephen H. Gunther, Beaverton, OR (US); Jeremy J. Shrall, Portland, OR (US); Shaun M. Conrad, Cornelius, OR (US); Avinash N. Ananthakrishnan, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 319 days.

This patent is subject to a terminal disclaimer.

(21) Appl. No.: 13/783,978

(22) Filed: Mar. 4, 2013

(65) Prior Publication Data

US 2014/0068293 A1    Mar. 6, 2014

Related U.S. Application Data

(63) Continuation of application No. 13/600,666, filed on Aug. 31, 2012, now Pat. No. 9,063,727.

(51) Int. Cl.
 *G06F 1/32* (2006.01)
 *G06F 1/20* (2006.01)

(52) U.S. Cl.
 CPC ... *G06F 1/32* (2013.01); *G06F 1/206* (2013.01); *G06F 1/324* (2013.01); *G06F 1/3206* (2013.01); *Y02B 60/1217* (2013.01)

(58) Field of Classification Search
 CPC .................................................. G06F 1/3203
 USPC .......................................................... 713/320
 See application file for complete search history.

(56) References Cited

U.S. PATENT DOCUMENTS 5,163,153 A  11/1992  Cole et al.
5,287,292 A   2/1994  Kenny et al.
(Continued)

FOREIGN PATENT DOCUMENTS

EP    1 282 030 A1   5/2003

OTHER PUBLICATIONS

SPEC—Power and Performance, Design Overview V1.10, Standard Performance Information Corp., Oct. 21, 2008, 6 pages.

(Continued)

*Primary Examiner* — Suresh Suryawanshi
(74) *Attorney, Agent, or Firm* — Trop, Pruner & Hu, P.C.

(57) ABSTRACT

In an embodiment, a processor includes a first domain with at least one core to execute instructions and a second domain coupled to the first domain and including at least one non-core circuit. These domains can operate at independent frequencies, and a power control unit coupled to the domains may include a thermal logic to cause a reduction in a frequency of the first domain responsive to occurrence of a thermal event in the second domain. Other embodiments are described and claimed.

20 Claims, 8 Drawing Sheets

(56) References Cited

U.S. PATENT DOCUMENTS

| | | |
|---|---|---|
| 5,522,087 A | 5/1996 | Hsiang |
| 5,590,341 A | 12/1996 | Matter |
| 5,621,250 A | 4/1997 | Kim |
| 5,931,950 A | 8/1999 | Hsu |
| 6,748,546 B1 | 6/2004 | Mirov et al. |
| 6,792,392 B1 | 9/2004 | Knight |
| 6,823,516 B1 | 11/2004 | Cooper |
| 6,829,713 B2 | 12/2004 | Cooper et al. |
| 6,908,227 B2 | 6/2005 | Rusu et al. |
| 6,996,728 B2 | 2/2006 | Singh |
| 7,010,708 B2 | 3/2006 | Ma |
| 7,043,649 B2 | 5/2006 | Terrell |
| 7,093,147 B2 | 8/2006 | Farkas et al. |
| 7,111,179 B1 | 9/2006 | Girson et al. |
| 7,194,643 B2 | 3/2007 | Gonzalez et al. |
| 7,272,730 B1 | 9/2007 | Acquaviva et al. |
| 7,349,762 B2 | 3/2008 | Omizo et al. |
| 7,412,615 B2 | 8/2008 | Yokota et al. |
| 7,434,073 B2 | 10/2008 | Magklis et al. |
| 7,437,270 B2 | 10/2008 | Song et al. |
| 7,454,632 B2 | 11/2008 | Kardach et al. |
| 7,467,059 B2 * | 12/2008 | Therien et al. ............... 702/130 |
| 7,529,956 B2 | 5/2009 | Stufflebeam |
| 7,539,885 B2 | 5/2009 | Ma |
| 7,730,340 B2 | 6/2010 | Hu et al. |
| 7,949,887 B2 | 5/2011 | Gunther et al. |
| 8,069,358 B2 | 11/2011 | Gunther et al. |
| 8,954,770 B2 * | 2/2015 | Ananthakrishan et al. ... 713/320 |
| 2001/0044909 A1 | 11/2001 | Oh et al. |
| 2002/0194509 A1 | 12/2002 | Plante et al. |
| 2003/0061383 A1 | 3/2003 | Zilka |
| 2004/0064752 A1 | 4/2004 | Kazachinsky et al. |
| 2004/0098560 A1 | 5/2004 | Storvik et al. |
| 2004/0139356 A1 | 7/2004 | Ma |
| 2004/0268166 A1 | 12/2004 | Farkas et al. |
| 2005/0022038 A1 | 1/2005 | Kaushik et al. |
| 2005/0033881 A1 | 2/2005 | Yao |
| 2005/0132238 A1 | 6/2005 | Nanja |
| 2005/0288886 A1 | 12/2005 | Therien et al. |
| 2006/0050670 A1 | 3/2006 | Hillyard et al. |
| 2006/0053326 A1 | 3/2006 | Naveh |
| 2006/0059286 A1 | 3/2006 | Bertone et al. |
| 2006/0069936 A1 | 3/2006 | Lint et al. |
| 2006/0117202 A1 | 6/2006 | Magklis et al. |
| 2006/0184287 A1 | 8/2006 | Belady et al. |
| 2007/0005995 A1 | 1/2007 | Kardach et al. |
| 2007/0016817 A1 | 1/2007 | Albonesi et al. |
| 2007/0079294 A1 | 4/2007 | Knight |
| 2007/0106827 A1 | 5/2007 | Boatright et al. |
| 2007/0130448 A1 * | 6/2007 | Jourdan et al. ............... 712/218 |
| 2007/0156992 A1 | 7/2007 | Jahagirdar |
| 2007/0214342 A1 | 9/2007 | Newburn |
| 2007/0234083 A1 | 10/2007 | Lee |
| 2007/0239398 A1 | 10/2007 | Song et al. |
| 2007/0245163 A1 | 10/2007 | Lu et al. |
| 2008/0028240 A1 | 1/2008 | Arai et al. |
| 2008/0250260 A1 | 10/2008 | Tomita |
| 2009/0006871 A1 | 1/2009 | Liu et al. |
| 2009/0150695 A1 | 6/2009 | Song et al. |
| 2009/0150696 A1 | 6/2009 | Song et al. |
| 2009/0158061 A1 | 6/2009 | Schmitz et al. |
| 2009/0158067 A1 | 6/2009 | Bodas et al. |
| 2009/0172375 A1 | 7/2009 | Rotem et al. |
| 2009/0172428 A1 | 7/2009 | Lee |
| 2009/0235105 A1 | 9/2009 | Branover et al. |
| 2009/0313489 A1 | 12/2009 | Gunther et al. |
| 2010/0115309 A1 | 5/2010 | Carvalho et al. |
| 2010/0146513 A1 | 6/2010 | Song |
| 2010/0191997 A1 | 7/2010 | Dodeja et al. |
| 2011/0154090 A1 | 6/2011 | Dixon et al. |
| 2012/0079290 A1 | 3/2012 | Kumar et al. |
| 2012/0246506 A1 | 9/2012 | Knight |
| 2013/0080804 A1 | 3/2013 | Ananthakrishnan et al. |
| 2013/0173941 A1 | 7/2013 | Ananthakrishnan et al. |
| 2014/0089688 A1 | 3/2014 | Man et al. |

OTHER PUBLICATIONS

Intel Technology Journal, "Power and Thermal Management in the Intel Core Duo Processor," May 15, 2006, pp. 109-122.

Anoop Iyer, et al., "Power and Performance Evaluation of Globally Asynchronous Locally Synchronous Processors," 2002, pp. 1-11.

Greg Semeraro, et al., "Hiding Synchronization Delays in a GALS Processor Microarchitecture," 2004, pp. 1-13.

Joan-Manuel Parcerisa, et al., "Efficient Interconnects for Clustered Microarchitectures," 2002, pp. 1-10.

Grigorios Magklis, et al., "Profile-Based Dynamic Voltage and Frequency Scaling for a Multiple Clock Domain Microprocessor," 2003, pp. 1-12.

Greg Semeraro, et al., "Dynamic Frequency and Voltage Control for a Multiple Clock Domain Architecture," 2002, pp. 1-12.

Greg Semeraro, "Energy-Efficient Processor Design Using Multiple Clock Domains with Dynamic Voltage and Frequency Scaling," 2002, pp. 29-40.

Diana Marculescu, "Application Adaptive Energy Efficient Clustered Architectures," 2004, pp. 344-349.

L. Benini, et al., "System-Level Dynamic Power Management," 1999, pp. 23-31.

Ravindra Jejurikar, et al., "Leakage Aware Dynamic Voltage Scaling for Real-Time Embedded Systems," 2004, pp. 275-280.

Ravindra Jejurikar, et al., "Dynamic Slack Reclamation With Procrastination Scheduling in Real-Time Embedded Systems," 2005, pp. 13-17.

R. Todling, et al., "Some Strategies for Kalman Filtering and Smoothing," 1996, pp. 1-21.

R.E. Kalman, "A New Approach to Linear Filtering and Prediction Problems," 1960, pp. 1-12.

International Application No. PCT/US2012/028865, filed Mar. 13, 2012, entitled "Providing Efficient Turbo Operation of a Processor," by Intel Corporation.

International Application No. PCT/US2012/028902, filed Mar. 13, 2012, entitled "Dynamically Controlling Interconnect Frequency in a Processor," by Intel Corporation.

International Application No. PCT/US2012/028876, filed Mar. 13, 2012, entitled "Dynamically Computing an Electrical Design Point (EDP) for a Multicore Processor," by Intel Corporation.

U.S. Appl. No. 13/247,564, filed Sep. 28, 2011, entitled, "Estimating Temperature of a Processor Core in a Low Power State ", by Avinash N. Ananthakrishnan, et al.

U.S. Appl. No. 13/282,896, filed Oct. 27, 2011, entitled, "Enabling a Non-Core Domain to Control Memory Bandwidth ", by Avinash N. Ananthakrishnan, et al.

U.S. Appl. No. 13/282,947, filed Oct. 27, 2011, entitled, "Controlling Operating Frequency of a Core Domain Via a Non-Core Domain of a Multi-Domain Processor ", by Avinash N. Ananthakrishnan, et al.

U.S. Appl. No. 13/285,414, filed Oct. 31, 2011, entitled, "Controlling a Turbo Mode Frequency of a Processor," by Avinash N. Ananthakrishnan, et al.

U.S. Appl. No. 13/247,580, filed Sep. 28, 2011, entitled, "Controlling Temperature of Multiple Domains of a Multi-Domain Processor," by Avinash N. Ananthakrishnan, et al.

U.S. Appl. No. 13/285,465, filed Oct. 31, 2011, entitled, "Dynamically Controlling Cache Size to Maximize Energy Efficiency," by Avinash N. Ananthakrishnan, et al.

U.S. Appl. No. 13/225,677, filed Sep. 6, 2011, entitled, "Dynamically Allocating a Power Budget Over Multiple Domains of a Processor," by Avinash N. Ananthakrishnan, et al.

U.S. Patent Application Serial No, 13/600,568, filed Aug. 31, 2012, entitled, "Configuring Power Management Functionality in a Processor," by Malini K. Bhandaru, et al.

International Searching Authority, "Notification of Transmittal of the International Search Report and the Written Opinion of the International Searching Authority," mailed Oct. 18, 2013, in International application No. PCT/US2013/048045.

* cited by examiner

US 9,189,046 B2

PERFORMING CROSS-DOMAIN THERMAL CONTROL IN A PROCESSOR

BACKGROUND

This application is a continuation of U.S. patent application Ser. No. 13/600,666, filed Aug. 31, 2012, the content of which is hereby incorporated by reference.

BACKGROUND

As technology advances in the semiconductor field, devices such as processors incorporate ever-increasing amounts of circuitry. Over time, processor designs have evolved from a collection of independent integrated circuits (ICs), to a single integrated circuit, to multicore processors that include multiple processor cores within a single IC package. As time goes on, ever greater numbers of cores and related circuitry are being incorporated into processors and other semiconductors.

Multicore processors are being extended to include additional functionality by incorporation of other functional units within the processor. Typically, a multicore processor has a global power budget and a global thermal budget. The power budget is set so that a specified power level, at least as averaged over time, is not exceeded. The thermal budget is set such that a thermal throttle point, which is a highest allowable temperature at which the processor can safely operate, is not exceeded. Although these common budgets exist, mechanisms to adaptively share the budgets across the wide variety of circuitry present in a processor does not exist.

DETAILED DESCRIPTION

Figure 1:
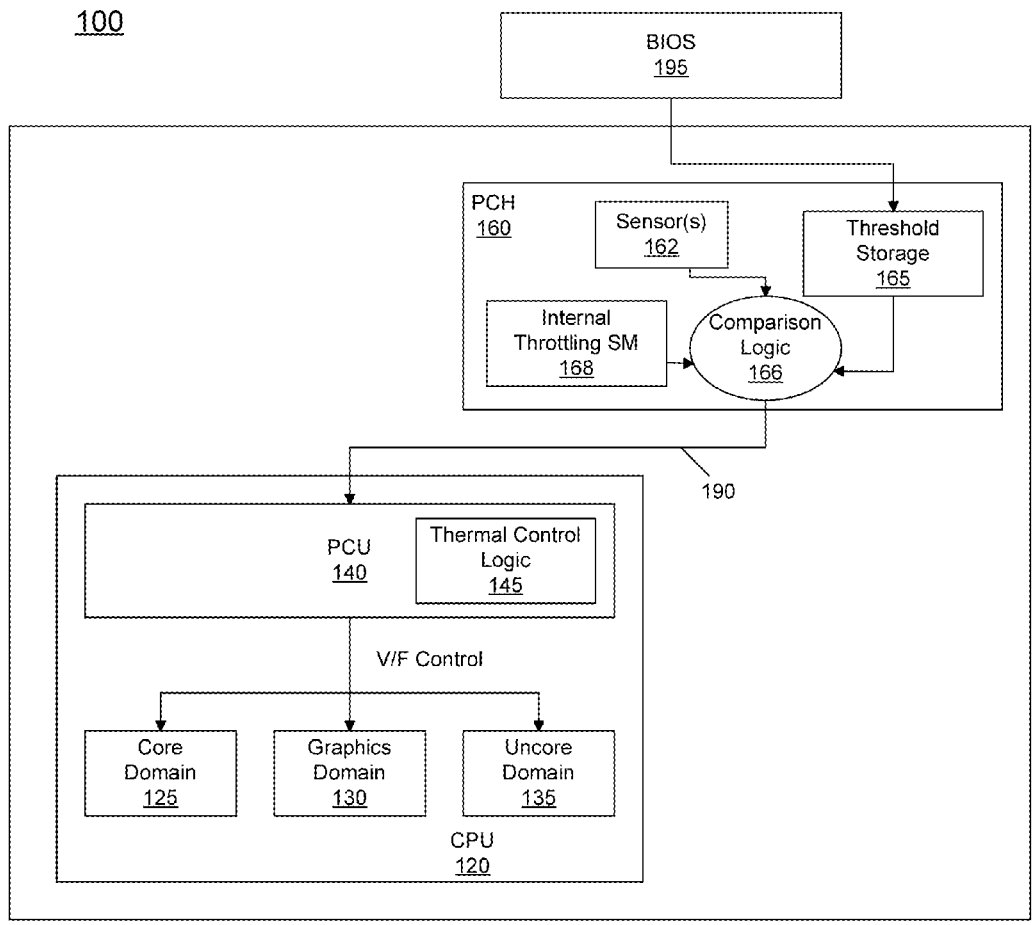
FIG. 1 is a block diagram of a processor in accordance with an embodiment of the present invention.

In various embodiments, a processor having multiple independent domains can be controlled to prevent a temperature of any of the domains from exceeding a maximum junction temperature. As used herein, the term "maximum junction temperature" is a highest temperature at which a semiconductor product is specified to be fully operational without breakdown. As an example, this temperature can be determined during device characterization, both during manufacture as well as testing in a laboratory environment, and stored in a non-volatile storage or fuse logic of the device. However, a throttle point, which may be set at or below this junction temperature, can be configurable, e.g., by software or firmware to a value lower than the maximum junction temperature $T_j$. In this way, an original equipment manufacturer (OEM) can dial down the throttle point as a function of $T_j$ (e.g., using basic input/output system (BIOS)). As an example and not for purposes of limitation, for a multicore processor the throttle point can be set at between approximately 80 and 110 degrees Celsius.

Note that this throttle point can be reached at different performance levels of a processor. For example, according to an operating system (OS)-based mechanism, namely the Advanced Configuration and Platform Interface (ACPI) standard (e.g., Rev. 3.0b, published Oct. 10, 2006), a processor can operate at various performance states or levels, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic state in which, when power and/or thermal budget is available, processor hardware can configure the processor or at least portions thereof to operate at a higher than guaranteed frequency. In many implementations a processor can include multiple so-called bin frequencies above a guaranteed maximum frequency, also referred to as a P1 frequency. At any of these performance states, and more likely in a P0 or P1 state, the throttle point may be reached.

A processor may incorporate a throttling mechanism to prevent any component of the processor from operating above its maximum junction temperature. The throttling mechanism may cause a reduction in frequency, in turn causing the power consumption also to decrease, leading to a decrease in the temperature.

Examples described herein are in connection with a multicore processor including multiple processor cores and one or more other processing engines, as well as other circuitry. For example, in a particular embodiment described herein, a processor package can include multiple semiconductor die including a so-called central processing unit (CPU) die and at least one other die which may include memory, controller circuitry, or other logic. In one embodiment, multiple independent domains may be present on the CPU die, including a core domain having one or more cores, a graphics domain having one or more graphics engines, and a so-called system agent or uncore domain that includes additional processor circuitry. As used herein the term "domain" is used to mean a collection of hardware and/or logic that operates at the same voltage and frequency point. With reference to a multi-chip package (MCP), note that each die may also be considered an independent domain although each such die may itself include multiple domains. Although many implementations described herein are for a MCP in which different domains can be present on different semiconductor die of a single package, a multi-domain processor also can be formed on a single semiconductor die in other implementations.

In various embodiments there are cross-domain thermal interactions, such that the temperature of one domain affects the temperature of another domain. These cross-domain interactions can be considered and accounted for when controlling the temperature of each domain. As used herein, a "thermal event" is an occurrence of a temperature of a given domain that exceeds a threshold temperature set for such domain. More specifically, to mitigate against a thermal event in one domain a corrective action, such as thermal throttling, may be applied in another domain. This may allow the domain experiencing the thermal event to reduce its temperature and thus maintain the processor below its maximum junction temperature.

In particular embodiments described herein, a non-CPU domain can provide an indication of a thermal event occurring in that domain to the CPU domain to thus enable a power controller or other logic within the CPU domain to take corrective action such as performing a throttling event within the CPU domain (or another domain) to thus enable a resolution to the thermal event.

Referring now to FIG. 1, shown is a block diagram of a processor in accordance with an embodiment of the present invention. In FIG. 1, processor 100 may be a multicore processor that in the embodiment shown is a MCP having a first die 120 and a second die 160. As seen, first die 120 may be a CPU die that includes a plurality of independent domains. As also seen, second die 160 may be a peripheral controller hub (PCH). In general, the PCH may include interface and control circuitry to provide an interface between the processor and a variety of peripheral devices such as input/output (IO) devices, e.g., user input devices (e.g., keyboard, touchpad, mouse or other pointing device, or so forth) and storage devices such as a mass storage, portable or other such storage, among many other peripheral devices.

CPU die 120 may include multiple domains including a core domain 125 which may include one or more processor cores, a graphics domain 130 which may include one or more graphics processing units (GPU) such as one or more graphics cores, and an uncore domain 135 which may include other circuitry of the processor such as cache memories, a memory controller, other fixed function units, logic circuitry and so forth.

As further seen, CPU die 120 further includes a power control unit (PCU) 140 which in the embodiment shown may include a thermal control logic 145. In general, PCU 140 may be configured with various circuitry, logic and so forth to perform power management operations for the processor.

Note that the view shown in FIG. 1 is at a high level to show the features relevant to cross-domain thermal control in accordance with an embodiment of the present invention and is not intended to show the full processor circuitry. In addition, the location of some circuitry is shown logically rather than physically, in that in some embodiments PCU 140 may be physically part of uncore domain 135.

As further seen in FIG. 1, second die 160 may include one or more thermal sensors 162, which in an embodiment can be implemented via various circuitry. As seen, these sensors can communicate information to a comparison logic 166 that further receives one or more thermal throttling thresholds. Note that the thermal thresholds, which may be stored in a threshold storage 165 such as a set of registers, lookup table or other storage, can be received from a BIOS 195, e.g., stored in a non-volatile storage, which may provide these thermal threshold values. Based on a comparison of one or more temperature values from the sensors to one or more of these thresholds, it can be determined whether a thermal event has occurred. When a thermal event occurs, as determined by comparison logic 166, a signal can be sent to an internal throttling state machine 168 which may take corrective action within PCH 160 to cause a reduction in temperature. In an embodiment, this state machine may perform various thermal throttling activities to enable the temperature reduction. Throttling may be achieved by reducing activity within the PCH, e.g., by inserting null operations (nops) into a stream of instructions, reducing frequency, and/or blocking traffic ingress/egress.

In addition, on a detection of a thermal event in PCH 160, a thermal event message can be sent from the PCH to CPU die 120, and more specifically to PCU 140 via a sideband message link 190, which in an embodiment can be a power management synchronization (PMSYNC) link. In one embodiment, this indication of a thermal event may be via a single bit communicated on a single lane of the sideband message link. For example, when no thermal event is detected within the PCH, this lane may communicate a logic low signal. In contrast, upon detection of a thermal event, this lane may be caused to communicate a logic high signal to thus indicate occurrence of the thermal event.

While shown at this high level in the embodiment of FIG. 1, understand the scope of the present invention is not limited in this regard. For example, while FIG. 1 shows an implementation in which a multicore processor is configured as a MCP including two die, in another embodiment the multicore processor may be a single die processor including both the circuitry present on the CPU die as well as the circuitry present on the PCH die. In addition, it is to be understood that additional circuitry may be present. Or in other embodiments, a different type of non-CPU circuitry may be present in a multicore processor. For example, in another embodiment instead of a PCH die, an integrated memory die may be provided within a multicore processor.

Figure 2:
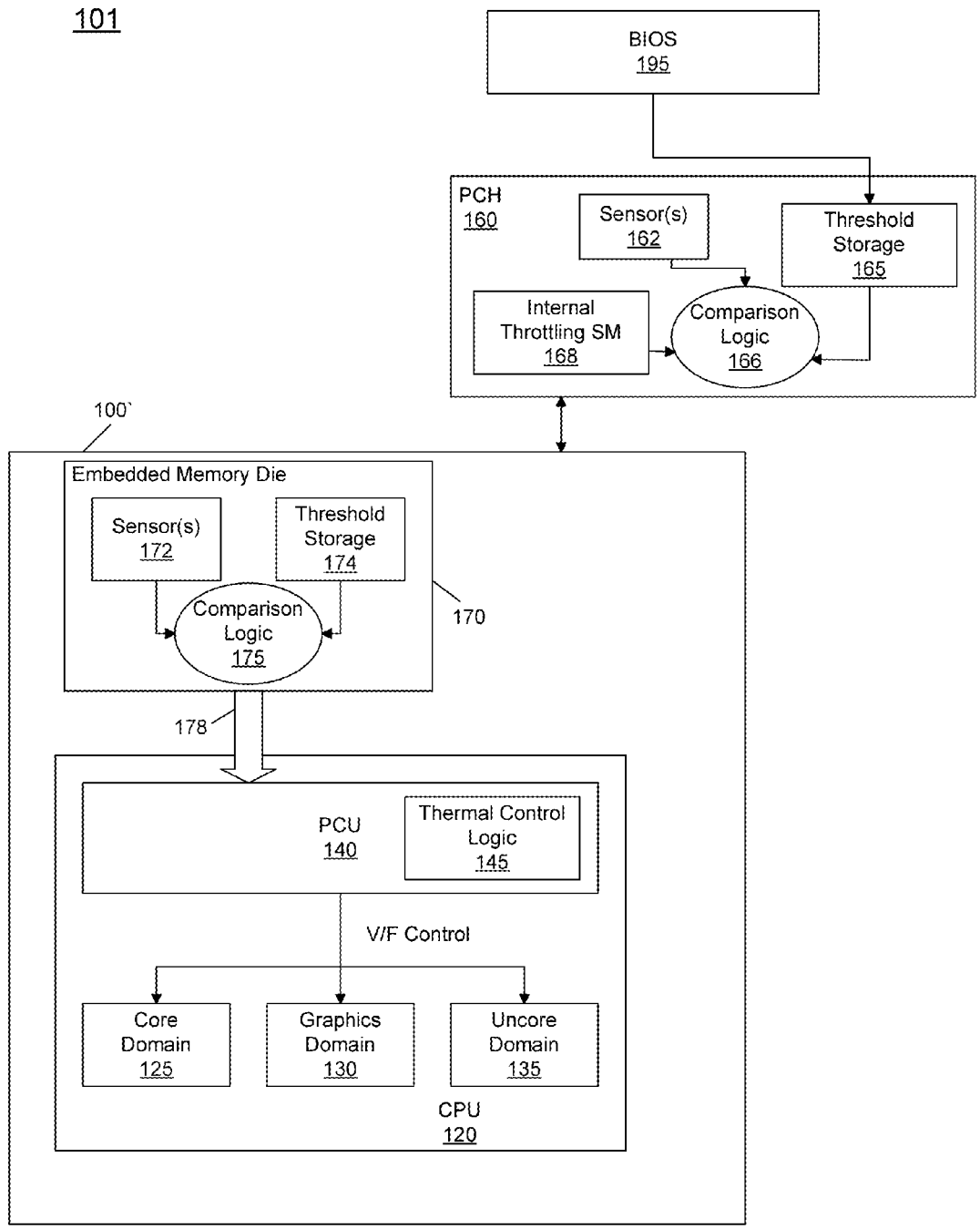
FIG. 2 is a block diagram of a processor in accordance with another embodiment of the present invention.

Referring now to FIG. 2, shown is a block diagram of a processor in accordance with another embodiment of the present invention. As shown in FIG. 2, a processor 100' may be a multichip package within a system 101 and may include a CPU die 120, which can be implemented similarly to that of FIG. 1. Instead in the embodiment of FIG. 2, processor 100 further includes an embedded memory die 170 which in an embodiment can be implemented using embedded dynamic random access memory (eDRAM), and which may act as a main or a system memory for the system, and not as a cache for the CPU die (as this die includes integrated cache memory). As seen, this memory die may include one or more temperature sensors 172 configured to provide temperature information to a comparison logic 175. As further seen, memory die 170 may include a threshold storage 174 which is configured to store one or more thresholds such as a maximum junction temperature for the die. Based on this comparison in comparison logic 175, if a value from one or more of the thermal sensors 172 exceeds the maximum junction temperature, a thermal event is thus identified and can be communicated to CPU die 120, and more particularly to PCU 140 by way of an inter-die communication bus 178.

Still referring to FIG. 2, note that system 101 including this processor 100' may further include a PCH 160, which may be configured the same as that of the internal PCH of FIG. 1. Of course a system can include many other components, but the illustration of FIG. 2 is simplified to show those components involved in performing cross-domain thermal control in accordance with an embodiment of the present invention.

Figure 3:
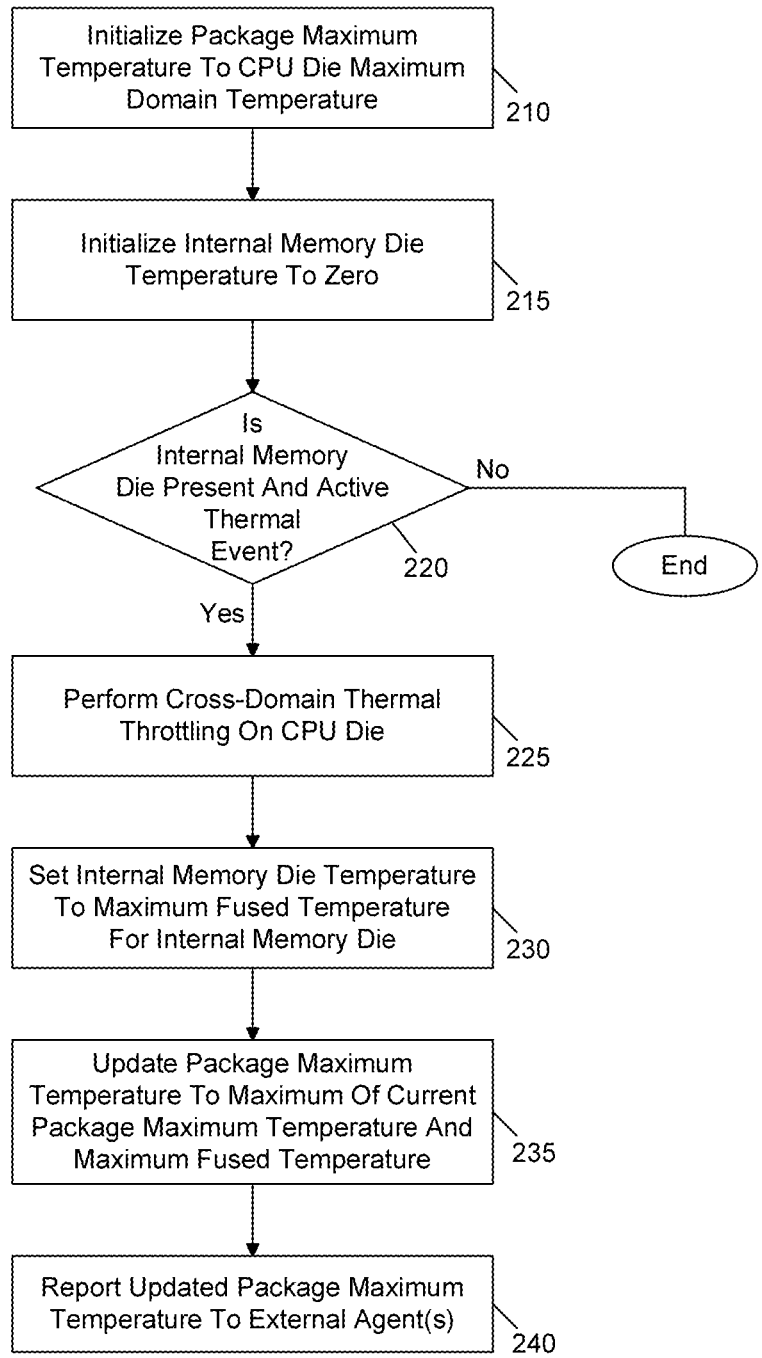
FIG. 3 is a flow diagram of a method for performing cross-domain thermal control in accordance with an embodiment of the present invention.

Embodiments may be performed in various locations. As one example, logic of a PCU of a processor can be used to perform the cross-domain thermal control in accordance with an embodiment of the present invention. Referring now to FIG. 3, shown is a method for performing cross-domain thermal control in accordance with an embodiment of the present invention. Method 200 of FIG. 3 may be performed by thermal logic of a PCU, in one embodiment, and can be performed on an iterative basis, namely once per predetermined interval (which may be approximately 1 millisecond (ms) in one embodiment). In general, the method may be performed based on a temperature of multiple domains of a processor. Such temperature information can be obtained directly from the domains, e.g., from a thermal sensor associated with each domain that is coupled to the PCU, e.g., via a push bus or other link. Or, temperature information can be determined within the PCU, e.g., based on thermal sensor data obtained from these thermal sensors.

As shown in FIG. 3, method 200 may begin by initializing a package maximum temperature to a CPU die maximum domain temperature (block 210). That is, assume an implementation in which a multicore processor is a multichip package including a CPU die and at least one other die (in the embodiment of FIG. 3, assume this other die is an internal memory die). The maximum domain temperature of the CPU die may correspond to the highest temperature recorded for the various temperature sensors present in the multiple domains of the CPU die. For example with reference back to FIG. 2, the highest temperature may be that associated with the given one of the core, graphics and uncore domains having the highest value. In an embodiment, this package maximum temperature can be stored in a storage location such as a register within the PCU. Next, control passes to block 215 where the internal memory die temperature may be initialized to a predetermined value, e.g., zero. This value may also be stored in a storage location such as a register of the PCU.

Still referring to FIG. 3, next control passes to diamond 220 where it can be determined whether the internal memory die is present and is undergoing an active thermal event (diamond 220). This determination may be based on the presence of a status signal for the die or other configuration information. And the indication of an active thermal event may be determined based on receipt of a thermal event message from this internal memory die. As discussed above, this event may be indicated by communication on a push bus, in one embodiment.

If such thermal event is determined to have occurred, control passes to block 225 where a cross-domain thermal throttling may be performed on the CPU die. Various operations can be undertaken within the CPU die to realize this thermal throttling. As one example, the thermal throttling can be performed by reducing a frequency of one or more domains of the die. For example, both the core domain and the graphics domain can have their frequency reduced, e.g., by a bin frequency. As used herein, a "bin frequency" corresponds to a smallest multiple by which a domain frequency can be updated. In some embodiments this bin frequency can be an integer multiple of a bus clock frequency, although the scope of the present invention is not limited in this regard. As another example, the selected amount may correspond to a degradation of a predetermined amount of a frequency bin. For example, the core domain frequency can be reduced by 1/N of a bin frequency. However, rather than performing frequency reductions by less than a bin frequency amount, embodiments allow for multiple iterations of the thermal control algorithm of FIG. 3 to be performed, and a count maintained of the number of 1/N reductions when a thermal throttling is indicated. Then at a natural bin boundary, which corresponds to N/N reductions, an actual frequency reduction to the given domain can be performed. In other embodiments, other manners of throttling temperature can be performed.

Referring still to FIG. 3, next at block 230 the internal memory die temperature (stored in a register of the PCU) can be set to a maximum fused temperature for the die. In an embodiment, this value can be stored in a storage location such as a PCU register, and may correspond to a maximum junction temperature for the die. Control next passes to block 235 where the package maximum temperature can be updated to a maximum of the current package maximum temperature (initialized above at block 210) and this maximum fused temperature. This value, which as discussed above can be stored in a storage location such as a PCU register, can be reported at block 240 to one or more external agents. As examples, this value can be reported to various system components such as an embedded controller that in turn may cause control of various system devices such as a fan, e.g., to increase fan speed to aid in cooling. This information may further be provided to other system components such as an operating system (OS), BIOS or other system software to enable various routines to be performed, e.g., to reduce activity in the system and/or processor to further reduce temperature. Although shown at this high level in the embodiment of FIG. 3, understand the scope of the present invention is not limited in this regard.

In general, frequency reduction can be performed using frequency control logic of the PCU, which can cause the given domain to have its frequency reduced. As an example, this frequency reduction process includes stopping all useful work of the domain, draining transactions pending in the domain, applying the new frequency (and possibly a new voltage) to the domain, and then resuming normal operation in that domain at the new frequency/voltage. Thus as seen, certain complexity is involved in a frequency change and furthermore this frequency change can take some amount of time. Temperature change can lag a frequency change and the amount of such time lag is a function of the thermal capacitance of the cooling solution deployed. By controlling the rate of frequency change to match the thermal capacitance of the cooling solution, control loop oscillations and fluctuations in frequency and temperature can be avoided. Accordingly, by only performing such frequency changes upon reaching a natural bin boundary, greater efficiency can be realized. This count of iterations at which a frequency is to be reduced by a 1/N amount can be stored, e.g., in a temporary storage such as a register, counter or other such storage. When the value in this counter thus reaches an integral amount, an actual frequency change can be performed.

Note that the mechanism to reduce the core domain frequency can be performed in different manners. For example, frequency control logic of the PCU can receive an instruction to update the core domain frequency. In turn, the frequency control logic may select various instructions to be sent to cause the frequency to be reduced. For example, various control signals can be sent to one or more phase lock loops (PLLs) or other frequency control mechanisms to cause the frequency to be reduced.

Figure 4:
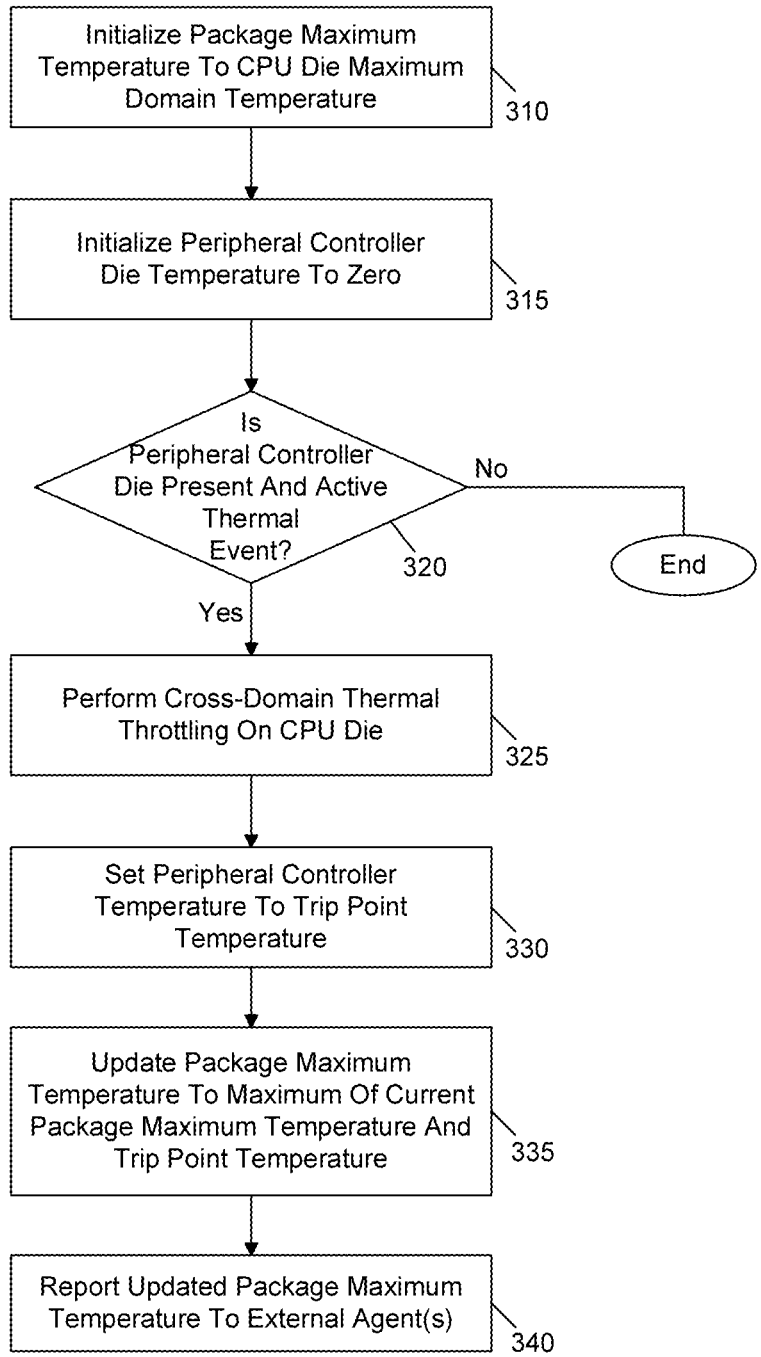
FIG. 4 is a flow diagram of a method for performing cross-domain thermal control in accordance with another embodiment of the present invention.

A similar control method can be used for the embodiment of FIG. 1 having a multicore processor including a CPU die and a PCH die. Referring now to FIG. 4, shown is a method for performing cross-domain thermal control in accordance with another embodiment of the present invention. Method 300 of FIG. 4 may be performed by thermal logic of the PCU, in one embodiment, as described above.

As shown in FIG. 4, method 300 may begin by initializing a package maximum temperature to a CPU die maximum domain temperature (block 310). That is, assume an implementation in which a multicore processor is a multichip package including a CPU die and at least one other die (in the embodiment of FIG. 4, assume this other die is a PCH die). The maximum domain temperature of the CPU die may correspond to the highest temperature recorded for the various temperature sensors present in the multiple domains of the CPU die. In an embodiment, this package maximum temperature can be stored in a storage location such as a register within the PCU. Next, control passes to block 315 where the PCH die temperature may be initialized to a predetermined value, e.g., zero. This value may also be stored in a storage location such as a register of the PCU.

Still referring to FIG. 4, next control passes to diamond 320 where it can be determined whether the PCH die is present and is undergoing an active thermal event. This determination may be based on the presence of a status signal for the die or other configuration information. And the indication of an active thermal event may be determined based on receipt of a thermal event message from this PCH die, which may be indicated via a sideband communication link.

If such thermal event is determined to have occurred, control passes to block 325 where a cross-domain thermal throttling may be performed on the CPU die. Various operations can be undertaken within the CPU die to realize this thermal throttling. As one example, the thermal throttling can be performed by reducing a frequency of one or more domains of the die.

Referring still to FIG. 4, next at block 330 the PCH die temperature (stored in a register of the PCU) can be set to the PCH temperature trip point. Control next passes to block 335 where the package maximum temperature can be updated to a maximum of the current package maximum temperature (initialized above at block 310) and the PCH temperature trip point. This value, which as discussed above can be stored in a storage location such as a PCU register, can be reported at block 340 to one or more external agents, as described above.

Referring now to Table 1, shown is a pseudo-code implementation of a thermal control algorithm in accordance with an embodiment of the present invention. Note that in this pseudo-code, the algorithm provides for analysis and thermal control for multiple types of non-CPU die within a processor. Specifically, the code shows operations performed in initializing temperature values, determining whether a thermal event occurs in a peripheral (non-CPU) die, performing a throttling operation if so, and reporting temperature information to one or more external agents. As seen, code can be present both for an internal memory die as well as an internal PCH die (even though in a given implementation only one of these die may be present). Of course it is to be understood the scope of the present invention is not limited in this regard and in other implementations, code may be present to perform cross-domain thermal control for other types of die or domains within a multi-domain package.

TABLE 1

```
//
EDRAM_therm_status // EDC/eDRAM therm_status reported over
pushbus
PCH_therm_status // PCH_therm_status reported over PMSync
//
//
Pkg_max_temp = max (all cores, graphics and uncore sensors);
eDRAM_temperature = 0;
If (EDRAM_present && EDRAM_therm_status) {
activate cross thermal throttling, i.e. reduce cores/graphics ratios;
eDRAM_temperature = eDRAM_fused_Tjmax;
pkg_max_temp = max (pkg_max_temp, eDRAM_temperature);
}
//
Pkg_max_temp = max (all cores, graphics and uncore sensors);
PCH_temperature = 0
If (PCH_present && PCH_therm_status) {
// activate cross thermal throttling, i.e. reduce frequency of core and
graphics domains
PCH_temperature = PCH_temperature_trip_point;
pkg_max_temp = max (pkg_max_temp, PCH_temperature);
}
```

Figure 5:
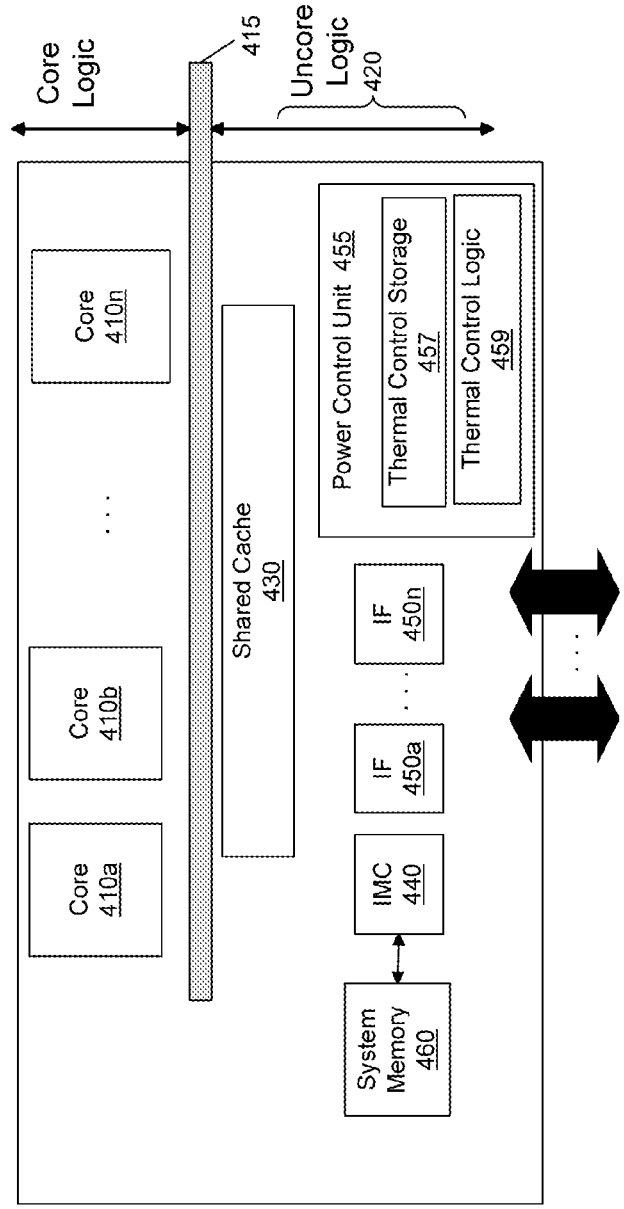
FIG. 5 is a block diagram of a processor in accordance with an embodiment of the present invention.

Referring now to FIG. 5, shown is a block diagram of a processor in accordance with an embodiment of the present invention. As shown in FIG. 5, processor 400 may be a multicore processor including a plurality of cores $410_a$-$410_n$. In one embodiment, each such core may be of an independent power domain and can be configured to operate at an independent voltage and/or frequency, and to enter a turbo frequency mode when available headroom exists. The various cores may be coupled via an interconnect 415 to a system agent or uncore 420 that includes various components. As seen, the uncore 420 may include a shared cache 430 which may be a last level cache. In addition, the uncore may include an integrated memory controller 440, various interfaces 450 and a power control unit 455.

In various embodiments, power control unit 455 may include a thermal control logic 459, which may be a logic to control a CPU domain frequency based on temperature not only of the domain itself, but also other domains of the processor. In the embodiment of FIG. 5, logic 459 can receive information as to whether a thermal event occurred in a given non-CPU domain, and if so to perform frequency control on another domain, e.g., a CPU domain, in accordance with an embodiment of the present invention. As further seen in FIG. 5 to provide for storage of different values for use in thermal control, a thermal control storage 457 may further be present within PCU 455 to store values such as the various maximum temperature values, at least some of which can be communicated to external agents, as described above. This storage may also store the Tj for the various die or domains. Although shown at this location in the embodiment of FIG. 5, understand that the scope of the present invention is not limited in this regard and the storage of this information can be in other locations.

With further reference to FIG. 5, processor 400 may communicate with a system memory 460, which can be on another die embedded in a package with a CPU die including the rest of the circuitry of processor 400, e.g., via a memory bus. In addition, by interfaces 450, connection can be made to various off-package components such as peripheral devices, mass storage and so forth. While shown with this particular implementation in the embodiment of FIG. 5, the scope of the present invention is not limited in this regard.

Figure 6:
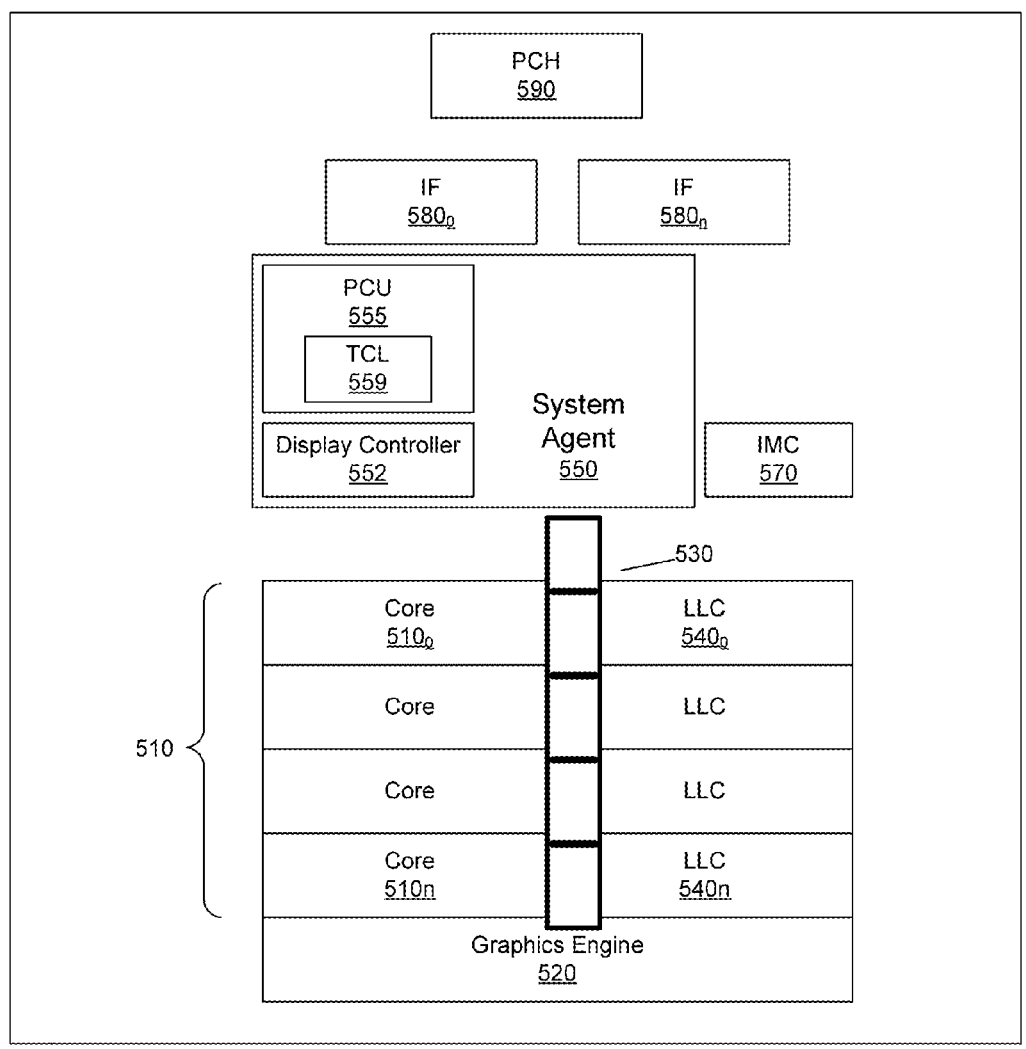
FIG. 6 is a block diagram of a multi-domain processor in accordance with another embodiment of the present invention.

Referring now to FIG. 6, shown is a block diagram of a multi-domain processor in accordance with another embodiment of the present invention. As shown in the embodiment of FIG. 6, processor 500 includes multiple domains. Specifically, a core domain 510 can include a plurality of cores 510a-510n, a graphics domain 520 can include one or more graphics engines, and a system agent domain 550 may further be present. In various embodiments, system agent domain 550 may execute at a fixed frequency and may remain powered on at all times to handle power control events and power management and each of domains 510 and 520 may operate at different voltage and/or power. Note that while only shown with three domains, understand the scope of the present invention is not limited in this regard and additional domains can be present in other embodiments. For example, multiple core domains may be present each including at least one core.

In general, each core 510 may further include low level caches in addition to various execution units and additional processing elements. In turn, the various cores may be coupled to each other and to a shared cache memory formed of a plurality of units of a last level cache (LLC) $540_0$-$540_n$. In various embodiments, LLC 550 may be shared amongst the cores and the graphics engine, as well as various media processing circuitry. As seen, a ring interconnect 530 thus couples the cores together, and provides interconnection between the cores, graphics domain 520 and system agent circuitry 550.

In the embodiment of FIG. 6, system agent domain 550 may include display controller 552 which may provide control of and an interface to an associated display. As further seen, system agent domain 550 may include a power control unit 555 which can include a frequency control logic 559 in accordance with an embodiment of the present invention. In various embodiments, this logic may execute algorithms such as shown in Table 1 to thus dynamically control frequency based on thermal events occurring on a non-CPU domain.

As further seen in FIG. 6, processor 500 can further include an integrated memory controller (IMC) 570 that can provide for an interface to a system memory, such as a dynamic random access memory (DRAM). Multiple interfaces $580_0$-$580_n$ may be present to enable interconnection between the processor and other circuitry. For example, in one embodiment at least one direct media interface (DMI) interface may be provided as well as one or more Peripheral Component Interconnect Express (PCI Express™ (PCIe™)) interfaces. Still further, to provide for communications between other agents such as additional processors or other circuitry, one or more interfaces in accordance with an Intel® Quick Path Interconnect (QPI) protocol may also be provided. As further seen, a PCH 590 may also be present within the processor, and can be implemented on a separate die, in some embodiments. Although shown at this high level in the embodiment of FIG. 6, understand the scope of the present invention is not limited in this regard.

Figure 7:
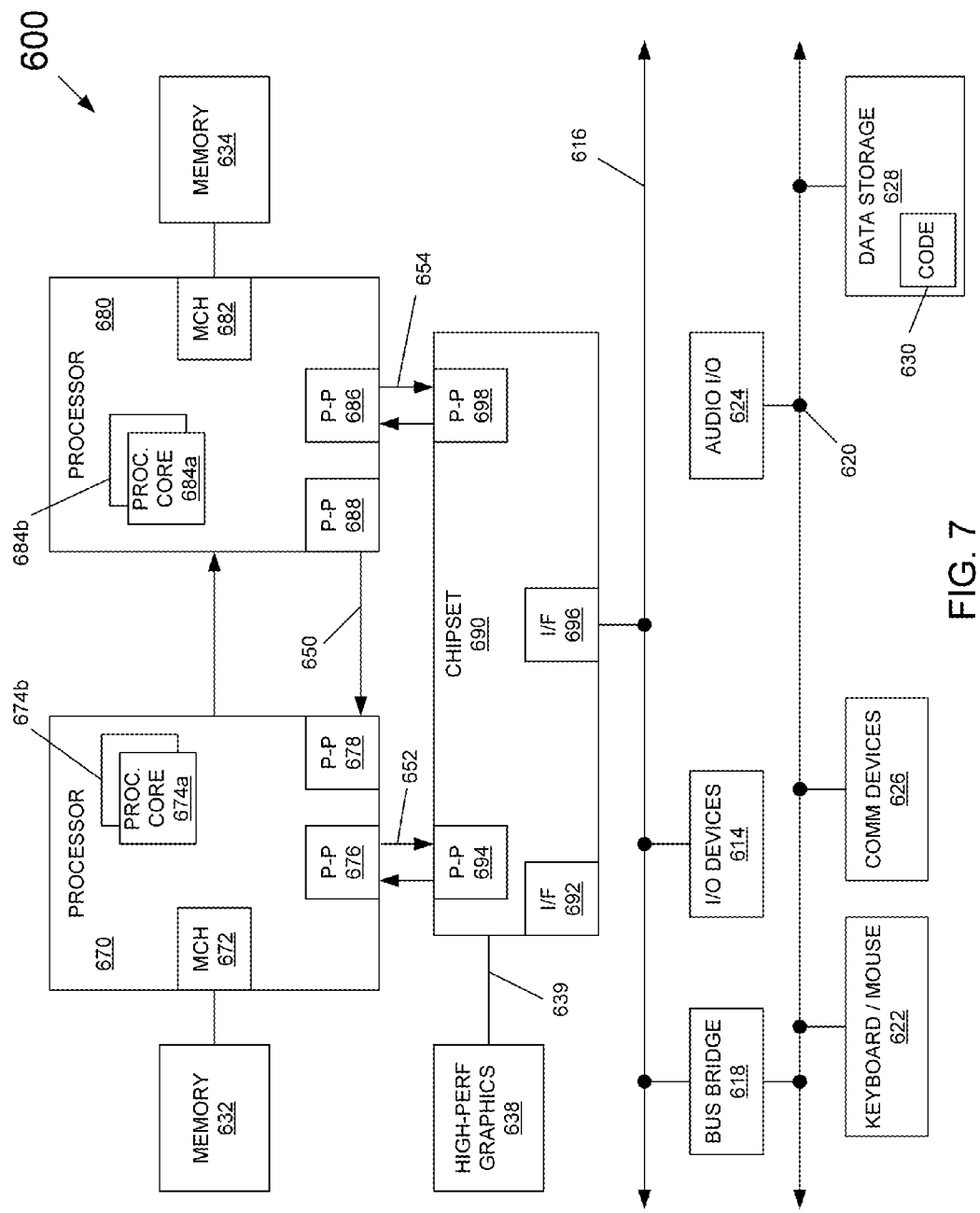
FIG. 7 is a block diagram of a system in accordance with an embodiment of the present invention.

Embodiments may be implemented in many different system types. Referring now to FIG. 7, shown is a block diagram of a system in accordance with an embodiment of the present invention. As shown in FIG. 7, multiprocessor system 600 is a point-to-point interconnect system, and includes a first processor 670 and a second processor 680 coupled via a point-to-point interconnect 650. As shown in FIG. 7, each of processors 670 and 680 may be multicore processors, including first and second processor cores (i.e., processor cores 674a and 674b and processor cores 684a and 684b), although potentially many more cores may be present in the processors. Each of the processors can include a PCU or other logic to perform dynamic frequency control of a domain of the processor based on thermal events of non-CPU domains, as described herein.

Still referring to FIG. 7, first processor 670 further includes a memory controller hub (MCH) 672 and point-to-point (P-P) interfaces 676 and 678. Similarly, second processor 680 includes a MCH 682 and P-P interfaces 686 and 688. As shown in FIG. 7, MCH's 672 and 682 couple the processors to respective memories, namely a memory 632 and a memory 634, which may be portions of system memory (e.g., DRAM) locally attached to the respective processors. First processor 670 and second processor 680 may be coupled to a chipset 690 via P-P interconnects 652 and 654, respectively. As shown in FIG. 7, chipset 690 includes P-P interfaces 694 and 698.

Furthermore, chipset 690 includes an interface 692 to couple chipset 690 with a high performance graphics engine 638, by a P-P interconnect 639. In turn, chipset 690 may be coupled to a first bus 616 via an interface 696. As shown in FIG. 7, various input/output (I/O) devices 614 may be coupled to first bus 616, along with a bus bridge 618 which couples first bus 616 to a second bus 620. Various devices may be coupled to second bus 620 including, for example, a keyboard/mouse 622, communication devices 626 and a data storage unit 628 such as a disk drive or other mass storage device which may include code 630, in one embodiment. Further, an audio I/O 624 may be coupled to second bus 620. Embodiments can be incorporated into other types of systems including mobile devices such as a smart cellular telephone, tablet computer, netbook, Ultrabook™, or so forth.

Figure 8:
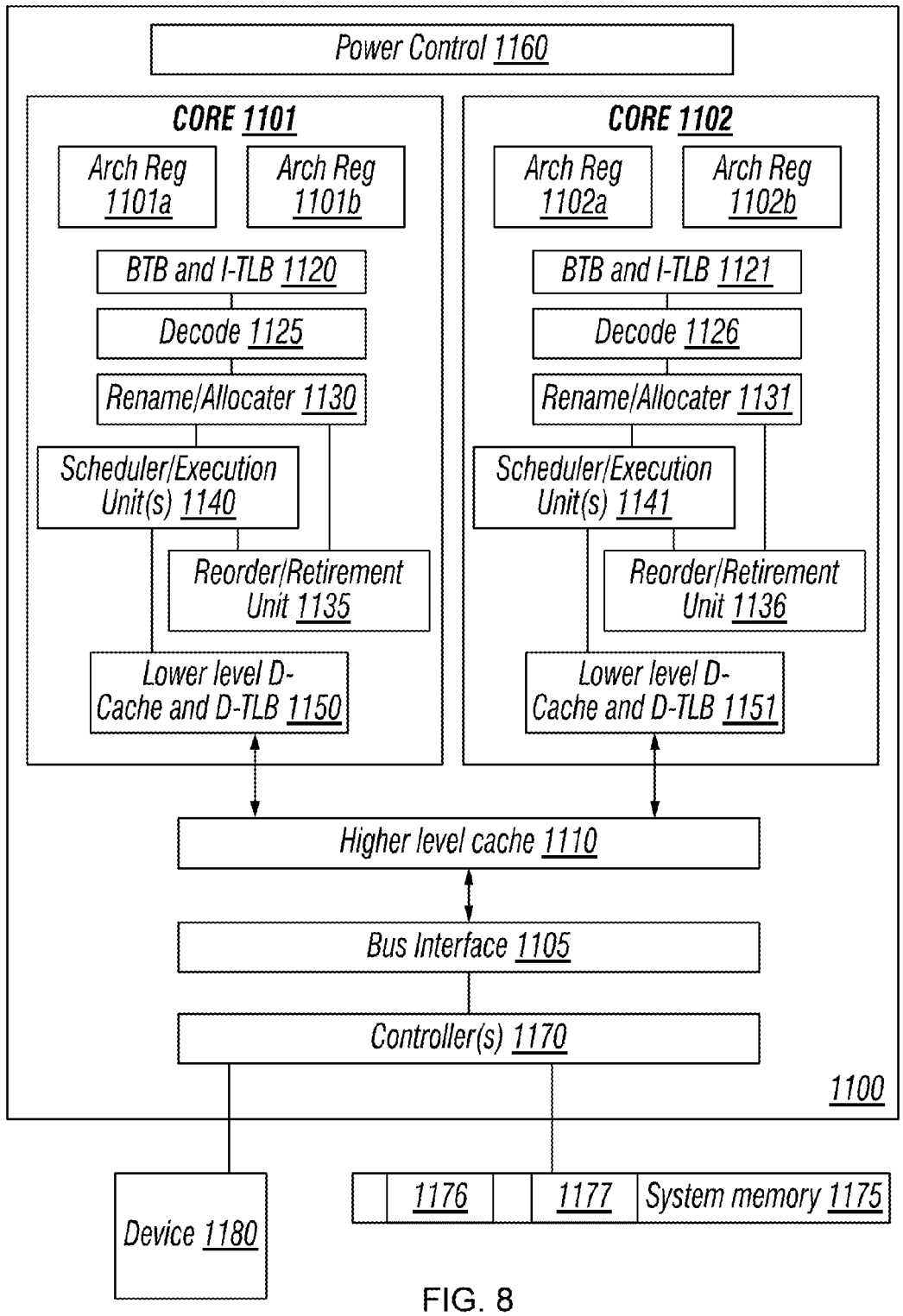
FIG. 8 is a block diagram of another embodiment of a processor in accordance with one embodiment of the present invention.

Referring to FIG. 8, an embodiment of a processor including multiple cores is illustrated. Processor 1100 includes any processor or processing device, such as a microprocessor, an embedded processor, a digital signal processor (DSP), a network processor, a handheld processor, an application processor, a co-processor, a system on a chip (SOC), or other device to execute code. Processor 1100, in one embodiment, includes at least two cores—core 1101 and 1102, which may include asymmetric cores or symmetric cores (the illustrated embodiment). However, processor 1100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1100, as illustrated in FIG. 8, includes two cores, core 1101 and 1102. Here, core 1101 and 1102 are considered symmetric cores, i.e. cores with the same configurations, functional units, and/or logic. In another embodiment, core 1101 includes an out-of-order processor core, while core 1102 includes an in-order processor core. However, cores 1101 and 1102 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 1101 are described in further detail below, as the units in core 1102 operate in a similar manner.

As depicted, core 1101 includes two hardware threads 1101a and 1101b, which may also be referred to as hardware thread slots 1101a and 1101b. Therefore, software entities, such as an operating system, in one embodiment potentially view processor 1100 as four separate processors, i.e., four logical processors or processing elements capable of executing four software threads concurrently. As alluded to above, a first thread is associated with architecture state registers 1101a, a second thread is associated with architecture state registers 1101b, a third thread may be associated with architecture state registers 1102a, and a fourth thread may be associated with architecture state registers 1102*b*. Here, each of the architecture state registers (1101*a*, 1101*b*, 1102*a*, and 1102*b*) may be referred to as processing elements, thread slots, or thread units, as described above. As illustrated, architecture state registers 1101*a* are replicated in architecture state registers 1101*b*, so individual architecture states/contexts are capable of being stored for logical processor 1101*a* and logical processor 1101*b*. In core 1101, other smaller resources, such as instruction pointers and renaming logic in allocator and renamer block 1130 may also be replicated for threads 1101*a* and 1101*b*. Some resources, such as re-order buffers in reorder/retirement unit 1135, ILTB 1120, load/store buffers, and queues may be shared through partitioning. Other resources, such as general purpose internal registers, page-table base register(s), low-level data-cache and data-TLB 1115, execution unit(s) 1140, and portions of out-of-order unit 1135 are potentially fully shared.

Processor 1100 often includes other resources, which may be fully shared, shared through partitioning, or dedicated by/to processing elements. In FIG. 8, an embodiment of a purely exemplary processor with illustrative logical units/resources of a processor is illustrated. Note that a processor may include, or omit, any of these functional units, as well as include any other known functional units, logic, or firmware not depicted. As illustrated, core 1101 includes a simplified, representative out-of-order (OOO) processor core. But an in-order processor may be utilized in different embodiments. The OOO core includes a branch target buffer 1120 to predict branches to be executed/taken and an instruction-translation buffer (I-TLB) 1120 to store address translation entries for instructions.

Core 1101 further includes decode module 1125 coupled to fetch unit 1120 to decode fetched elements. Fetch logic, in one embodiment, includes individual sequencers associated with thread slots 1101*a*, 1101*b*, respectively. Usually core 1101 is associated with a first ISA, which defines/specifies instructions executable on processor 1100. Often machine code instructions that are part of the first ISA include a portion of the instruction (referred to as an opcode), which references/specifies an instruction or operation to be performed. Decode logic 1125 includes circuitry that recognizes these instructions from their opcodes and passes the decoded instructions on in the pipeline for processing as defined by the first ISA. For example, decoders 1125, in one embodiment, include logic designed or adapted to recognize specific instructions, such as transactional instruction. As a result of the recognition by decoders 1125, the architecture or core 1101 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 1130 includes an allocator to reserve resources, such as register files to store instruction processing results. However, threads 1101*a* and 1101*b* are potentially capable of out-of-order execution, where allocator and renamer block 1130 also reserves other resources, such as reorder buffers to track instruction results. Unit 1130 may also include a register renamer to rename program/instruction reference registers to other registers internal to processor 1100. Reorder/retirement unit 1135 includes components, such as the reorder buffers mentioned above, load buffers, and store buffers, to support out-of-order execution and later in-order retirement of instructions executed out-of-order.

Scheduler and execution unit(s) block 1140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1150 are coupled to execution unit(s) 1140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1101 and 1102 share access to higher-level or further-out cache 1110, which is to cache recently fetched elements. Note that higher-level or further-out refers to cache levels increasing or getting further away from the execution unit(s). In one embodiment, higher-level cache 1110 is a last-level data cache—last cache in the memory hierarchy on processor 1100—such as a second or third level data cache. However, higher level cache 1110 is not so limited, as it may be associated with or includes an instruction cache. A trace cache—a type of instruction cache—instead may be coupled after decoder 1125 to store recently decoded traces.

In the depicted configuration, processor 1100 also includes bus interface module 1105 and a power controller 1160, which may perform cross-domain thermal control in accordance with an embodiment of the present invention. Historically, controller 1170 has been included in a computing system external to processor 1100. In this scenario, bus interface 1105 is to communicate with devices external to processor 1100, such as system memory 1175, a chipset (often including a memory controller hub to connect to memory 1175 and an I/O controller hub to connect peripheral devices), a memory controller hub, a northbridge, or other integrated circuit. And in this scenario, bus 1105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1175 may be dedicated to processor 1100 or shared with other devices in a system. Common examples of types of memory 1175 include DRAM, SRAM, non-volatile memory (NV memory), and other known storage devices. Note that device 1180 may include a graphic accelerator, processor or card coupled to a memory controller hub, data storage coupled to an I/O controller hub, a wireless transceiver, a flash device, an audio controller, a network controller, or other known device.

Note however, that in the depicted embodiment, the controller 1170 is illustrated as part of processor 1100. Recently, as more logic and devices are being integrated on a single die, such as SOC, each of these devices may be incorporated on processor 1100. For example in one embodiment, memory controller hub 1170 is on the same package and/or die with processor 1100. Here, a portion of the core (an on-core portion) includes one or more controller(s) 1170 for interfacing with other devices such as memory 1175 or a graphics device 1180. The configuration including an interconnect and controllers for interfacing with such devices is often referred to as an on-core (or un-core configuration). As an example, bus interface 1105 includes a ring interconnect with a memory controller for interfacing with memory 1175 and a graphics controller for interfacing with graphics processor 1180. Yet, in the SOC environment, even more devices, such as the network interface, co-processors, memory 1175, graphics processor 1180, and any other known computer devices/interface may be integrated on a single die or integrated circuit to provide small form factor with high functionality and low power consumption.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
    a first domain including at least one core to execute instructions, the at least one core including:
        a decoder to decode instructions;
        a scheduler to schedule decoded instructions for execution; and
        at least one execution unit to execute scheduled instructions;
    a second domain coupled to the first domain and including at least one non-core circuit, wherein the first and second domains are adapted to operate at independent frequencies; and
    a power controller coupled to the first and second domains, the power controller including a thermal logic to cause a reduction in a frequency of the first domain responsive to occurrence of a thermal event in the second domain.

2. The processor of claim 1, wherein the thermal logic is to cause the reduction in the first domain frequency by an amount corresponding to a frequency bin of the first domain.

3. The processor of claim 2, wherein the thermal logic is to update a value of a counter responsive to the thermal event occurrence.

4. The processor of claim 3, wherein the thermal logic is to cause the first domain frequency to be reduced by the frequency bin when the counter value is equal to a first value.

5. The processor of claim 1, wherein the thermal logic is to set a value of a temperature of the second domain to a second value responsive to the thermal event.

6. The processor of claim 5, wherein the thermal logic is to update a processor maximum temperature value to a maximum of a current processor maximum temperature value and the second value.

7. The processor of claim 6, wherein the thermal logic is to communicate the processor maximum temperature value to at least one agent external to the processor.

8. The processor of claim 7, wherein the at least one agent comprises an embedded controller, the embedded controller to cause a speed of a fan to increase responsive to the communication of the processor maximum temperature value.

9. The processor of claim 1, wherein the second domain comprises an internal memory die including a system memory formed of a random access memory (RAM), the second domain further including at least one thermal sensor.

10. The processor of claim 9, wherein the internal memory die further comprises a comparison logic to compare a temperature value received from the at least one thermal sensor to a threshold value.

11. The processor of claim 10, wherein the internal memory die is to communicate the thermal event to the first domain when the temperature value is greater than the threshold value.

12. The processor of claim 1, wherein the first domain comprises a core domain, a graphics domain and an uncore domain, and the second domain comprises a peripheral controller, the first and second domains configured on a single semiconductor die.

13. A system comprising:
    a processor including a first die having a core domain including a plurality of cores, a graphics domain including at least one graphics engine, and a system agent domain including a power controller, and a second die having a peripheral controller and coupled to the first die via a communication path to communicate an indication of a thermal event occurring on the second die, wherein the power controller is to reduce a frequency of at least one of the core domain and the graphics domain by a selected amount responsive to receipt of the thermal event indication; and
    a fan coupled to the processor.

14. The system of claim 13, wherein the power controller is to receive the indication from the second die via a push bus coupled between the first die and the second die.

15. The system of claim 13, wherein the power controller is to increment a value of a counter for the core domain responsive to receipt of the indication from the second die, and to reduce the core domain frequency by a bin frequency when the counter value equals N.

16. The system of claim 13, wherein the power controller is to update a processor maximum temperature value to a maximum of a current processor maximum temperature value and a maximum temperature of the second die, and communicate the processor maximum temperature value to an embedded controller coupled to the processor.

17. The system of claim 16, wherein the embedded controller is to cause a speed of the fan to be increased responsive to the communication.

18. A method comprising:
    sensing a temperature of a peripheral controller of a second domain of a processor, the processor further including a first domain having at least one core to execute instructions;
    communicating a message to a power controller of the processor via a sideband link coupled between the first domain and the second domain and using an internal control logic of the peripheral controller to throttle activity in the peripheral controller when the peripheral controller temperature exceeds a thermal threshold; and
    causing a change in a power state of the at least one core responsive to the message.

19. The method of claim 18, further comprising updating a processor maximum temperature value to a maximum of a current processor maximum temperature value and a maximum peripheral controller temperature value.

20. The method of claim 19, further comprising communicating the processor maximum temperature value to an embedded controller coupled to the processor.

\* \* \* \* \*